C. R. COLT.
AIR SPEED INDICATOR.
APPLICATION FILED JUNE 16, 1920.
1,436,575.
Patented Nov. 21, 1922.
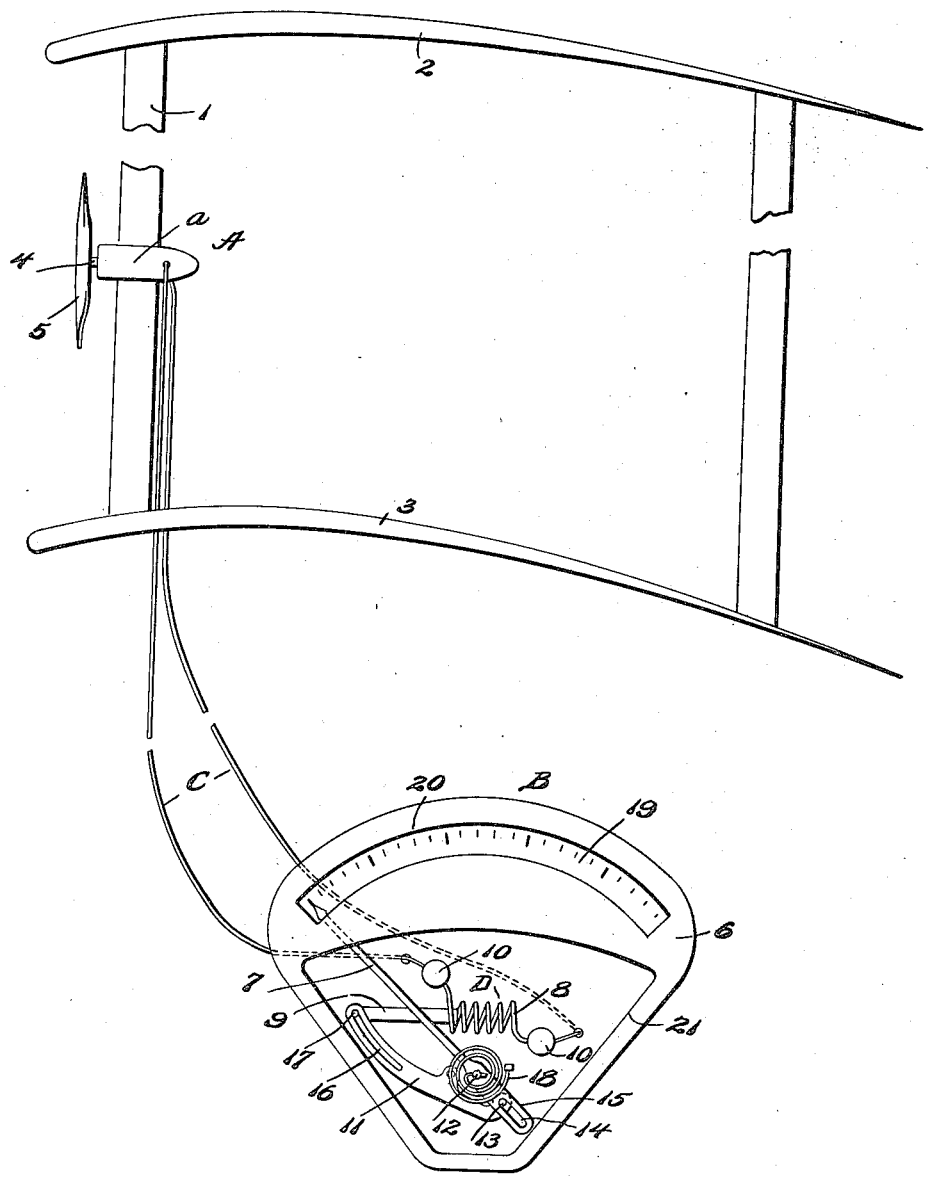
Inventor
Chas R Colt
Attorney

Patented Nov. 21, 1922.

1,436,575

UNITED STATES PATENT OFFICE.

CHARLES R. COLT, OF WASHINGTON, DISTRICT OF COLUMBIA.

AIR-SPEED INDICATOR.

Application filed June 16, 1920. Serial No. 389,440.

*To all whom it may concern:*

Be it known that I, CHARLES R. COLT, a citizen of the United States, residing at Washington, District of Columbia, have invented certain new and useful Improvements in Air-Speed Indicators, of which the following is a specification.

My invention relates to aircraft and particularly to means for accurately indicating the speed of travel or flight of such craft through the air.

Heretofore, speed indicators for aircraft have depended, in most of the devices in actual use, upon air pressure, or air trapped by a funnel like receiver, for example, and conducted through tubing to an indicator actuating element such as a bellows. Repair work on such an appliance has been found difficult, as, ordinarily, such tubing is housed in one of the wings or planes between the fabric surfaces thereof, and being comparatively inflexible, the removal and replacement of the tubing has necessitated the removal and replacement of a large section of the wing fabric, an expensive and time-consuming operation. Furthermore, in taking down and assembling an airplane, such tubing is frequently bent, mashed or otherwise injured, resulting in rendering the speed indicator of little value and practically unreliable.

The object of this invention is to produce a speed indicator for aircraft embodying a small air driven propeller (screw), an electric generator directly driven thereby and preferably of streamline formation to minimize head resistance, said elements to be disposed in the air stream line, indicating means embodying an electro-magnet, and flexible current-conducting means connecting said generator and magnet. The wires forming said conducting means may be easily strung through or otherwise placed in the wing or plane, passing in and out through small holes in the fabric, thus saving much labor and time and insuring the working efficiency of the speed indicator.

The invention consists in the construction, combination and arrangement herein fully described, illustrated and claimed.

The accompanying drawing graphically illustrates the complete speed indicator applied to an airplane.

The speed indicator, as a whole, comprises an electric generator A, an indicator B, and electric conductors C, connecting the generator with an electro-magnet D in the casing of the indicator B.

The generator A comprises a casing $a$ of streamline formation, as shown, the same being illustrated as mounted on one of the struts 1 connecting the top and bottom planes 2 and 3 respectively of a biplane structure. The shaft 4 of the generator has directly mounted thereon an air-driven propeller (screw), 5, facing forwardly and serving to drive the generator, the generating speed of which varies according to the speed of travel of the aircraft in actual flight as well as when rolling on the ground prior to taking off or after landing. The generator, including the propeller may be mounted on any part of the aircraft where it will be exposed to the air stream while the craft is in motion.

The indicating mechanism is housed in a casing 6 and comprises a pivoted and swinging indicating hand or pointer 7 controlled and actuated by the electro-magnet D, the latter being shown as a solenoid having a coil 8 and sliding core or armature 9. The coil 8 and sliding core or armature 9. The coil 8 are fastened to binding posts 10 to which are attached the conductors C.

The pointer 7 is coupled or linked to the armature 9 by any suitable transmission means such as a lever 11 mounted on the pivot pin 12 of the pointer 7, said lever having a stud 13 working in a slot 14 in an extension arm 15 of the pointer. The lever 11 has a curved slot 16 in which works a pin or stud 17 on the armature 9. A spring 18 holds the pointer 7 normally at zero but permits it to traverse a graduated scale 19 consisting of an arcuate calibrated plate visible through a glazed opening 20 in the casing 6. Another glazed opening 21 gives a view of the working parts of the mechanism above described.

As the generator is driven it generates electric energy in proportion to the speed attained, such speed, in turn being governed by and in accordance with the rate of travel of the aircraft in flight. The current thus generated is transmitted through the wire C to the coil 8 of the magnet D and the armature 9 is drawn into the coil. This rocks the lever 11 and the latter swings the pointer 7 over the face of the scale 19 which indicates in miles per hour or other measurement the rate of travel of the aircraft through the air.

The mechanism of the complete apparatus is simple and reliable in operation, and enables the indicator as a whole to be quickly mounted in position and unmounted for repair or transportation. The connecting means between the generator and indicator casing are flexible and therefore easily handled without danger of impairing the efficiency of the device.

What I claim is:

A speed indicating system for aircraft comprising, in combination, an indicator, a solenoid magnet, a swinging indicator hand, a motion transmitting lever connecting said hand with the armature of the solenoid magnet, a generator driven by an air-driven propeller, and electrical conductors extending from the generator to the coil of the solenoid magnet.

In testimony whereof I have affixed my signature.

CHAS. R. COLT.